United States Patent
Lin et al.

(10) Patent No.: US 7,492,438 B2
(45) Date of Patent: Feb. 17, 2009

(54) REPAIR STRUCTURE AND METHOD FOR LIQUID CRYSTAL DISPLAY

(75) Inventors: Sung-Chun Lin, Taichung County (TW); Te-Cheng Chung, Taoyuan Hsien (TW); Yi-Tse Lin, Kaohsiung County (TW); Hsuan-Chen Liu, Kaohsiung (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 190 days.

(21) Appl. No.: 11/669,972

(22) Filed: Feb. 1, 2007

(65) Prior Publication Data
US 2007/0206126 A1    Sep. 6, 2007

(30) Foreign Application Priority Data
Mar. 1, 2006    (TW) ............................... 95106937 A

(51) Int. Cl.
G02F 1/13    (2006.01)

(52) U.S. Cl. ............................. 349/192; 349/40; 349/55
(58) Field of Classification Search .................. 349/40, 349/55, 192
See application file for complete search history.

(56) References Cited

U.S. PATENT DOCUMENTS 7,224,415 B2 *    5/2007    Yi et al. ......................... 349/54

* cited by examiner

Primary Examiner—David Nelms
Assistant Examiner—Phu Vu
(74) Attorney, Agent, or Firm—Thomas, Kayden, Horstemeyer & Risley

(57) ABSTRACT

A data line repair structure for a liquid crystal display panel. The data line repair structure includes a first repair line parallel to a scan line and crossing the first end of a data line; a second repair line parallel to the data line and connected to a gate driving chip; and a third repair line parallel to the scan line and crossing the second end of the data line. When the data line has a broken point, the source driving chip transmits a data signal to a pixel electrode through the first repair line, the second repair line, and the third repair line.

24 Claims, 6 Drawing Sheets

REPAIR STRUCTURE AND METHOD FOR LIQUID CRYSTAL DISPLAY

BACKGROUND OF THE INVENTION

1. Field of the Invention

The invention relates to a data line repair structure and method for a liquid crystal display, and in particular to a data line repair structure and method applied to a chip-on-glass or thin film-on-glass structure.

2. Description of the Related Art

Active liquid crystal panels are currently broadly used in liquid crystal displays, liquid crystal display televisions and others, with panel size increasing. However, large liquid crystal panels use long lines, such as scan lines and data lines, to drive thin film transistors of each pixel unit. Broken points easily occur thereon during manufacture.

FIG. 1 shows a data line repair structure of a conventional liquid crystal display 100, comprising scan line 101 and intersecting data line 102. Gate driving chip 103 is bound to flexible board 104, forming a tape carrier package structure. One side of flexible board 104 is connected to liquid crystal display panel 100 and another side thereof is connected to printed circuit board 105. Source driving chip 106 is connected to flexible board 107, forming a tape carrier package structure. One side of flexible board 107 is connected to liquid crystal display panel 100 and another side thereof is connected to printed circuit board 108. Gate driving chip 103 generates a gate driving signal through scan line 101 to drive a thin film transistor (not shown in FIG. 1). Source driving chip 106 also generates a data signal through data line 102 to write the data signal to a pixel electrode (not shown in FIG. 1).

As shown in FIG. 1, the data line repair structure comprises first repair line 109 and second repair line 110. First repair line 109 is parallel to scan line 101 and crosses to one end of data line 102 opposite side of source driving chip 106. Second repair line 110 extends from the left side of flexible board 107 to the right side thereof and crosses to data line 102 connected to source driving chip 106. When data line 102 comprises broken point 111, a laser beam can be implanted to weld first repair line 109, second repair line 110 and data line 102 to form two connecting points 112a and 112b. First repair line 109 and second repair line 110 are connected through printed circuit boards 105 and 108. Thus, a data signal generated by source driving chip 106 is transmitted through second repair line 110, lines of printed circuit boards 108 and 105 and first repair line 109 sequentially to a data line above broken point 111.

The conventional repair structure and method use X and Y sides of printed circuit boards to connect a first repair line with a second repair line. If the liquid crystal display panel is chip-on-glass or chip-on-film structure, in which a driving chip is bound to the liquid crystal display panel or a flexible board to conserve X or Y sides of the printed circuit boards, the conventional repair structure and repair method can not be used.

BRIEF SUMMARY OF THE INVENTION

The invention provides a data line repair structure for a liquid crystal display panel. The liquid crystal display panel comprises a scan line, a data line crossing the scan line, a thin film transistor formed where the scan line crosses the data line and is connected to a pixel electrode, a gate driving chip electrical connected to the scan line to generate a gate signal to drive the thin film transistor, and a source driving chip connected to the data line to provide a data signal to the pixel electrode. The data line repair structure comprises a first repair line parallel to the scan line and crossing a first end of the data line, a second repair line parallel to the data line and connecting with the gate driving chip and a third repair line, parallel to the scan line and crossing a second end of the data line. When the data line has a broken point, the source driving chip transmits the data signal through the first repair line, the second repair line, and the third repair line to the pixel electrode.

The invention provides a data line repair method for a liquid crystal display panel. The liquid crystal display panel comprises a scan line, a data line crossing the scan line, a thin film transistor formed where the scan line crosses the data line and connected to a pixel electrode, a gate driving chip electrical connected to the scan line to generate a gate signal to drive the thin film transistor, and a source driving chip connected to the data line to provide a data signal to the pixel electrode. The data line repair method comprises forming a first data repair line parallel to the scan line and crossing a first end of the data line, welding and connecting the first repair line with the data line, forming a second data repair line parallel to the data line and connecting with the gate driving chip, forming a third repair line parallel to the scan line and crossing a second end of the data line and welding and connecting the third repair line with the data line. When the data line has a broken point, the source driving chip uses the first repair line, the second repair line and the third repair line to write the data signal to the pixel electrode.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
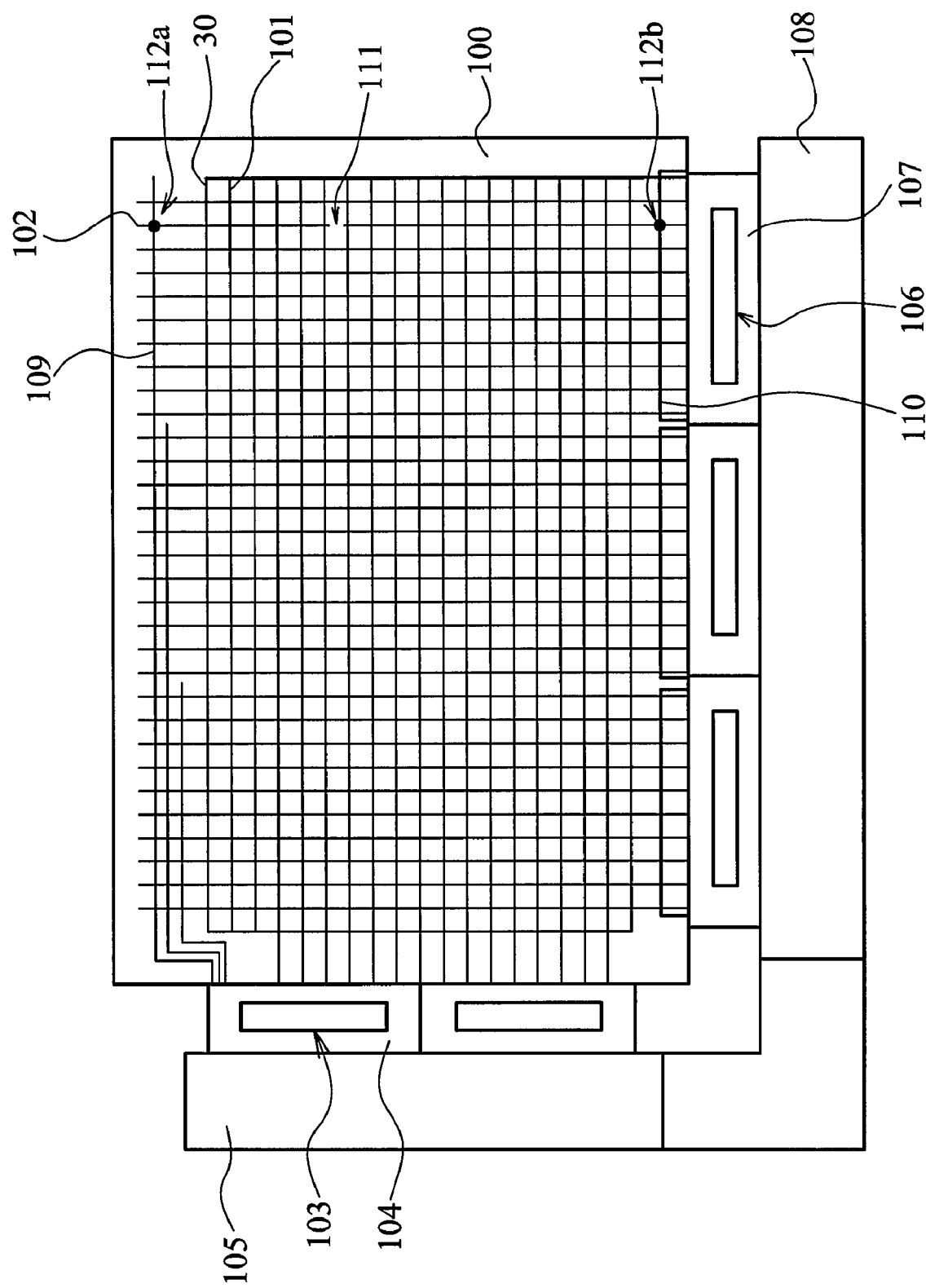
FIG. 1 shows a data line repair structure of a conventional liquid crystal display.
Figure 2:
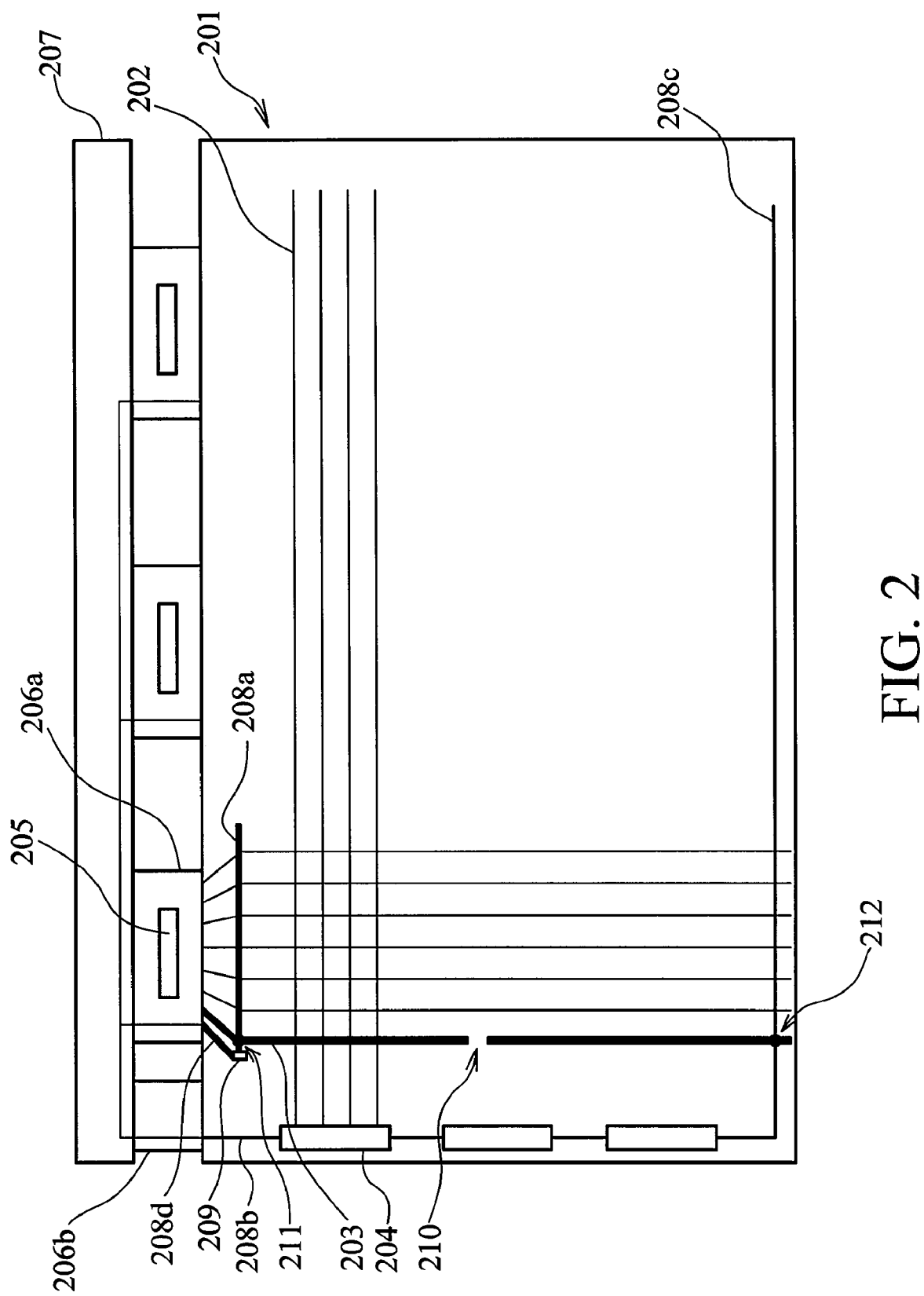
FIG. 2 shows a data line repair structure for a liquid crystal display panel according to a first embodiment of the invention.

FIG. 2 shows a data line repair structure for a liquid crystal display panel according to a first embodiment of the invention. Liquid crystal display panel 201, such as a glass baseboard, comprises scan line 202 and data line 203 crossing scan line 202. A thin film transistor (not shown in FIG. 2) is formed at an intersection of scan line 202 and data line 203. The thin film transistor comprises a gate coupled to scan line 202, a source coupled to data line 203 and a drain coupled to a pixel electrode (not shown). Gate driving chip 204 is connected by conductive glue to a Y side area of liquid crystal display panel 201, a chip-on-glass (COG) structure, and uses scan line 202 to transmit a gate signal to drive the thin film transistor. Source driving chip 205 is bound to flexible board 206a, a tape carrier package (TCP) structure, and uses data line 203 to transmit a data signal to write to the pixel electrode. One side of flexible board 206 is connected to liquid crystal display panel 201 and another side thereof is connected to printed circuit board 207. In addition, printed circuit board 207 comprises a plurality of power lines and ground lines.

As shown in FIG. 2, the data line repair structure comprises first repair line 208a, second repair line 208b and third repair line 208c. First repair line 208a is parallel to scan line 202 and crosses one end of data line 203 near source driving chip 205. Second repair line 208b is parallel to data line 203 and connected to gate driving chip 204. Second repair line 208b is connected to printed circuit board 207 through flexible board 206b. Third repair line 208c is parallel to scan line 202 and crosses another end of data line 203 on the opposite side of source driving chip 205. The data line repair structure further comprises fourth repair line 208d formed in an oblique line area of liquid crystal display panel 201 and connected to first repair line 208a and lines of printed circuit board 207 through flexible circuit board 206a. In addition, transparent conductive layer 209 is disposed between fourth repair line 208d and first repair line 208a.

According to the first embodiment of the invention, a laser beam can be implemented to weld first repair line 208a and data line 203 to form connecting point 211, weld third repair line 208c and data line 203 to form connecting point 212 and weld transparent conductive layer 209 to connect first repair line 208a with fourth repair line 208d when data line 203 comprises broken point 210. Thus, a data signal generated by source driving chip 205 is transmitted to data line below broken point 210 through first repair line 208a, fourth repair line 208d, flexible board 206a, lines of printed circuit board 207, flexible board 206b, second repair line 208b, inner circuits of gate driving chip 204 and third repair line 208c sequentially.

Figure 3A:
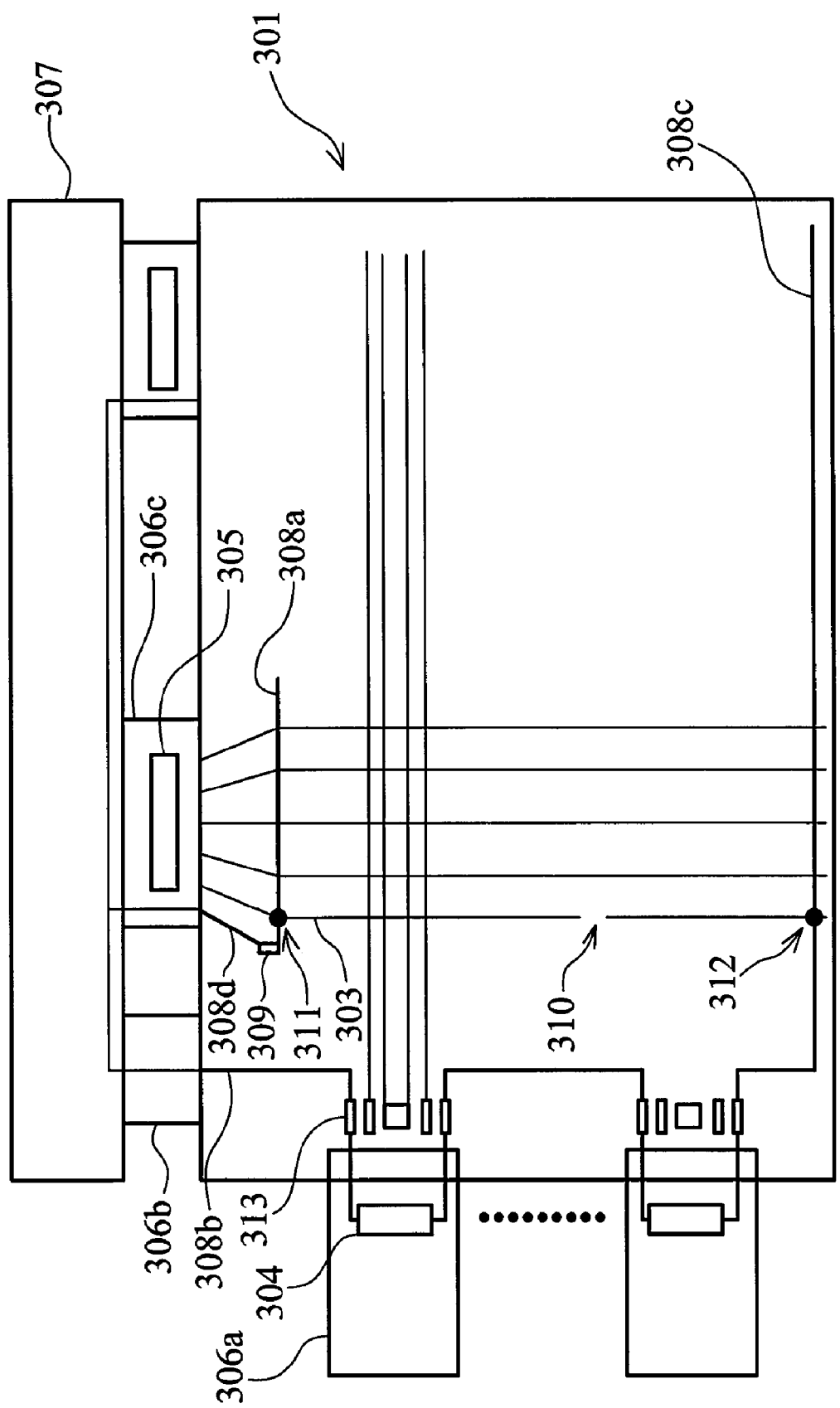
FIG. 3A shows a data line repair structure for a liquid crystal display panel according to a second embodiment of the invention.

FIG. 3A shows a data line repair structure for a liquid crystal display panel according to a second embodiment of the invention. Liquid crystal display panel 301 is similar to the first embodiment of the invention, except that, here, gate driving chip 304 is bound to flexible board 306a, a chip-on-film (COF) structure. Flexible board 306a is connected to liquid crystal display panel 301. Thus, second repair line 308b is connected to gate driving chip 304 through connecting pad 313 and one line of flexible board 306a. As shown in FIG. 3A, a laser beam can be implemented to weld first repair line 308a and data line 303 to form connecting point 311, weld third repair line 308c and data line 303 to form connecting point 312 and weld transparent conductive layer 309 to connect first repair line 308a with fourth repair line 308d when data line 303 comprises broken point 310. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, flexible board 306a, inner circuits of gate driving chip 304 and third repair line 308c sequentially.

Figure 3B:
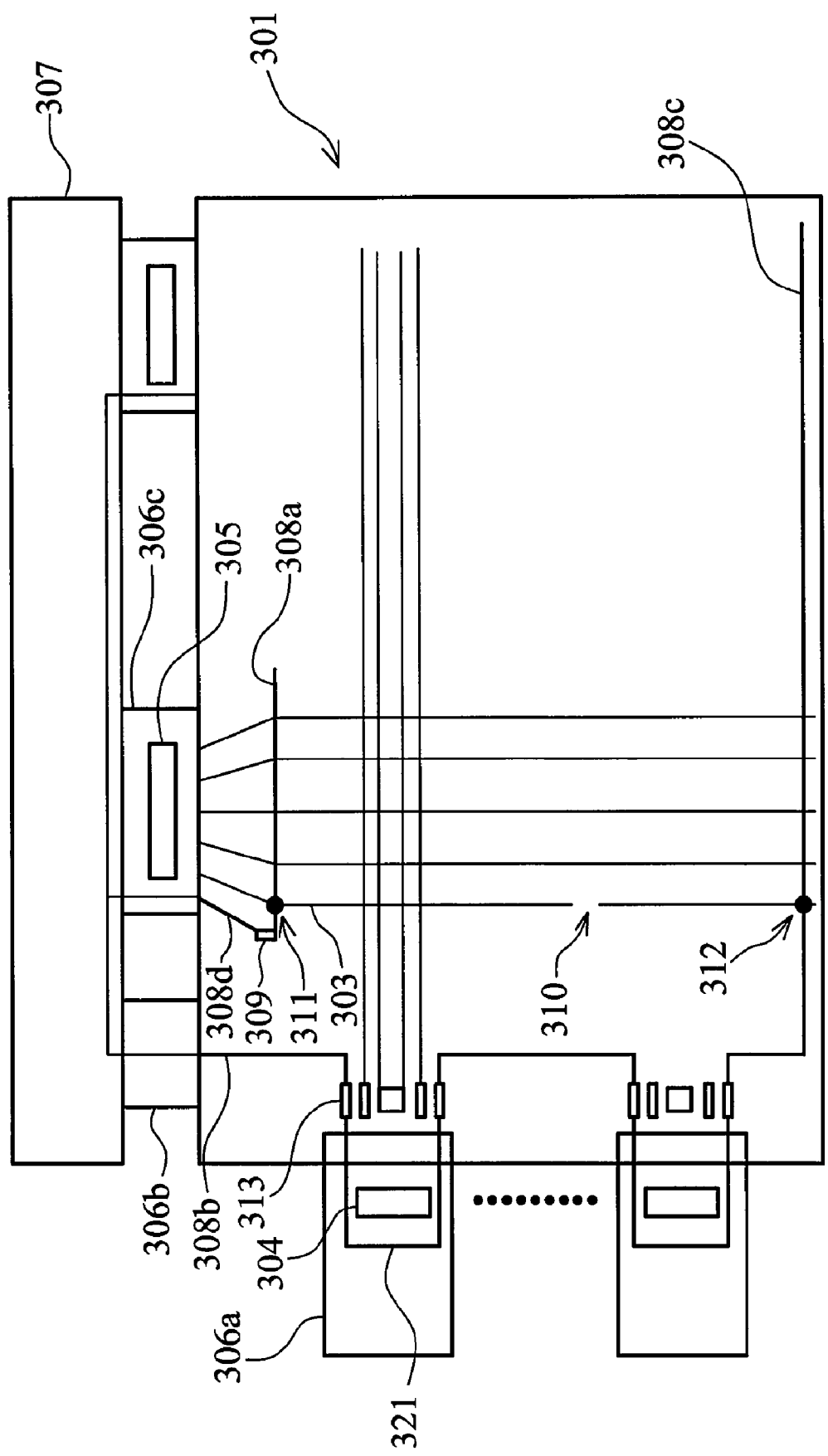
FIG. 3B shows a data line repair structure for a liquid crystal display panel according to a third embodiment of the invention.

FIG. 3B shows a data line repair structure for a liquid crystal display panel according to a third embodiment of the invention. A data signal generated by source driving chip 305 is transmitted through bypass circuit line 321 not inner circuits of gate driving chip 304. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, flexible board 306a, bypass circuit line circuit line 321 and third repair line 308c sequentially.

Figure 4:
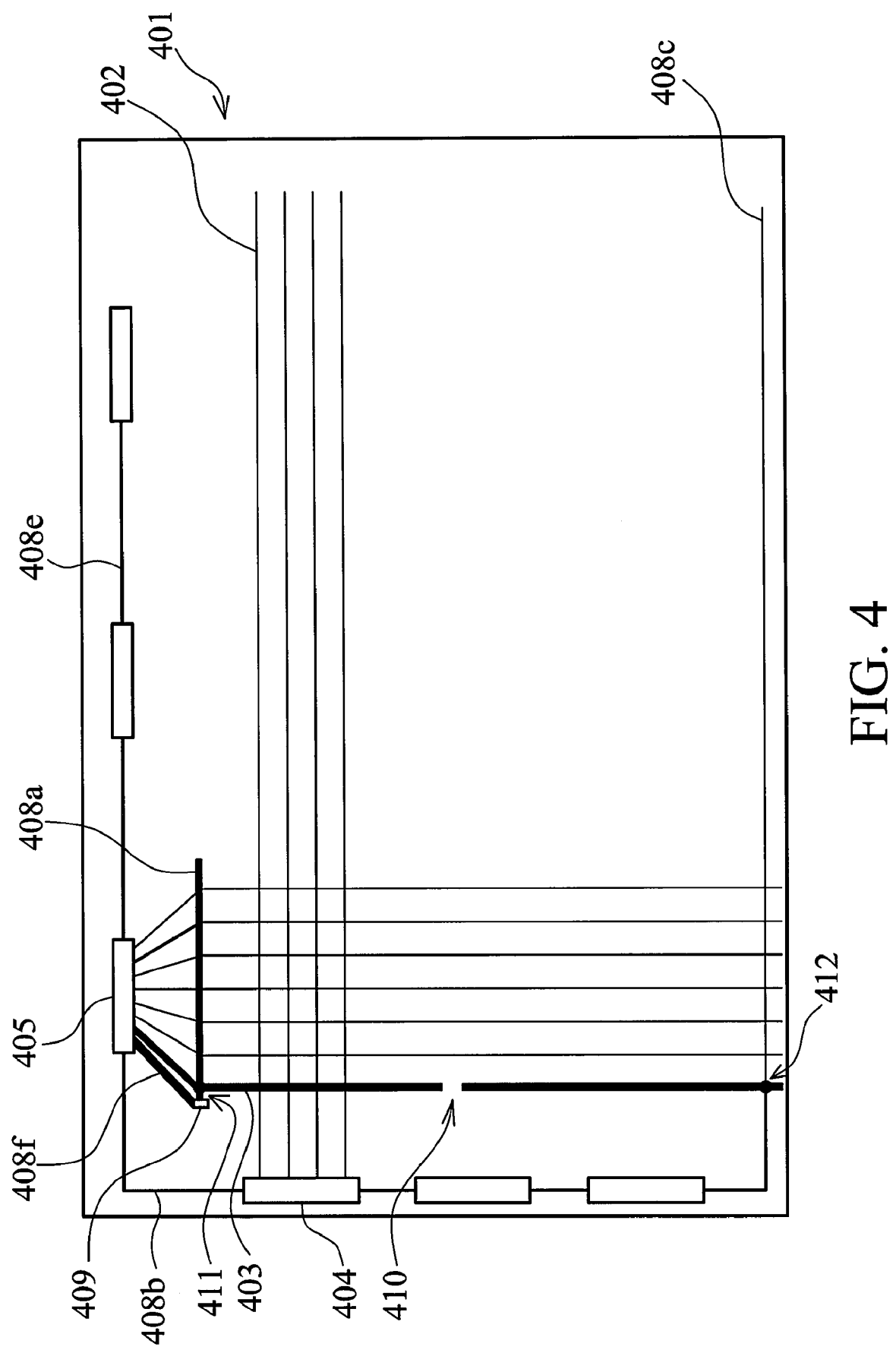
FIG. 4 shows a data line repair structure for a liquid crystal display panel according to a fourth embodiment of the invention.

FIG. 4 shows a data line repair structure for a liquid crystal display panel according to a fourth embodiment of the invention. Liquid crystal display panel 401 is similar to the first embodiment of the invention, except that, here, source driving chip 405 uses conductive glue to connect with an X side area of liquid crystal display panel 401. Thus, the data line repair structure further comprises fifth repair line 408e and sixth repair line 408f. Fifth repair line 408 is parallel to scan line 402 and connected to source driving chip 405. Sixth repair line 408f is formed in an oblique line area of liquid crystal display 401 and connected to first repair line 408a and inner circuits of source driving chip 405. In addition, transparent conductive layer 409 is disposed between sixth repair line 408f and first repair line 408a.

As shown in FIG. 4, the laser beam can be implemented to weld first repair line 408a and data line 403 to form connecting point 411, weld third repair line 408c and data line 403 to form connecting point 412 and weld transparent conductive layer 409 to connect first repair line 408a with sixth repair line 408f when data line 403 comprises broken point 410. Thus, a data signal generated by source driving chip 405 is transmitted to data line below broken point 310 through first repair line 408a, sixth repair line 408f, inner circuits of source driving chip 405, fifth repair line 408e, second repair line 408b, inner circuits of gate driving chip 404 and third repair line 408c sequentially.

Figure 5:
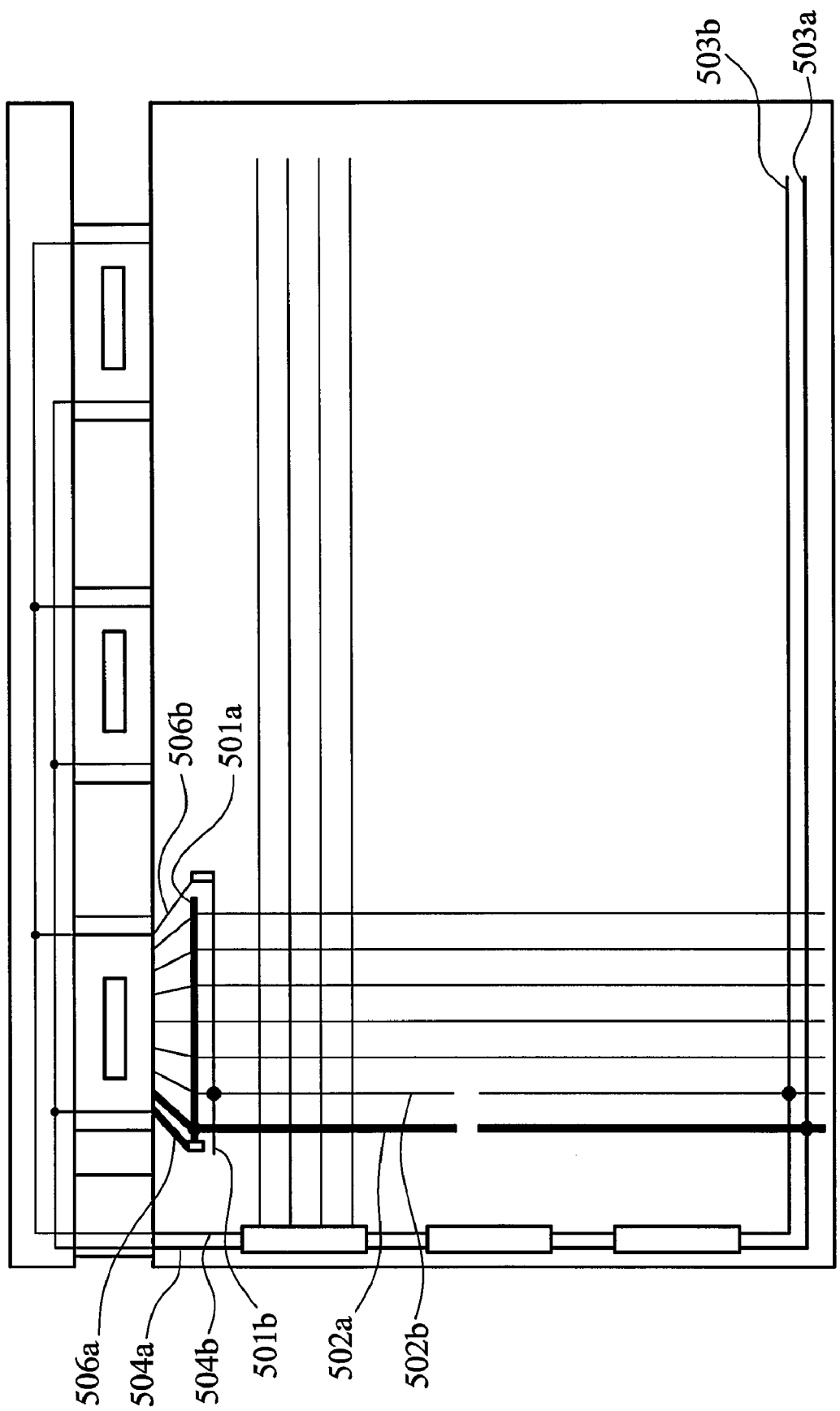
FIG. 5 shows a data line repair structure for a liquid crystal display panel according to a fifth embodiment of the invention.

In the embodiments, multiple repair lines of the data line repair structure are disclosed. Thus, if there are pluralities of data lines with broken points on crystal liquid display panel, each corresponding repair line can be used to repair each data line with a broken point. As shown in FIG. 5, first repair lines 501a and 501b are welded and connected to odd data line 502a and even data line 502b respectively. Third repair line 503a and 503b are also welded and connected to odd data line 502a and even data line 502b respectively. Thus, when odd data line 502a has a broken point, it can use first repair line 501a, fourth repair line 506a, second repair line 504a and third repair line 503a to transmit a data signal. When even data line 502b has a broken point, it can use first repair line 501b, fourth repair line 506b, second repair line 504b and third repair line 503b to transmit a data signal.

The invention relates to a data line repair structure and repair method for liquid crystal display panels. The feature of the invention is a second repair line connected to a gate driving chip and uses inner circuits of the gate driving chip to transmit a data signal. Based on the liquid crystal display panel of the invention, the gate driving chip is a chip-on-glass structure or thin film-on-glass structure. The source driving chip is a chip-on-glass structure or tape carrier package structure.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data line repair structure for a liquid crystal display panel comprising a scan line, a data line crossing the scan line, a thin film transistor formed where the scan line crosses the data line and connected to a pixel electrode, a gate driving chip electrical connected to the scan line to generate a gate signal to drive the thin film transistor, and a source driving chip connected to the data line to provide a data signal to the pixel electrode, the data line repair structure comprising:

a first repair line parallel to the scan line and crossing a first end of the data line;

a second repair line parallel to the data line and connecting with the gate driving chip; and a third repair line parallel to the scan line and crossing a second end of the data line;

wherein the source driving chip transmits the data signal through the first repair line, the second repair line, and the third repair line to the pixel electrode when the data line has a broken point.

2. The data line repair structure as claimed in claim 1, wherein the gate driving chip is bound to the liquid crystal display panel.

3. The data line repair structure as claimed in claim 1, wherein the gate driving chip is bound to a flexible board, the second repair line is connected to the gate driving chip by a line of the flexible board and the third repair line is connected to the gate driving chip by another line of the flexible board.

4. The data line repair structure as claimed in claim 1, wherein the second repair line is connected to a bypass circuit line of the flexible board and the third repair line is connected to the bypass circuit line of the flexible board.

5. The data line repair structure as claimed in claim 1, further comprising a fourth repair line formed in an oblique line area of the liquid crystal display panel and connected to the first repair line and lines of a printed circuit board.

6. The data line repair structure as claimed in claim 5, wherein the fourth repair line is connected to the lines of the printed circuit board through a flexible board and the source driving chip is connected to the flexible board.

7. The data line repair structure as claimed in claim 5, wherein a transparent conductive layer is disposed between the fourth repair line and the first repair line.

8. The data line repair structure as claimed in claim 1, further comprising a fifth repair line parallel to the scan line and connected to the source driving chip.

9. The data line repair structure as claimed in claim 8, wherein the source driving chip is bound to the liquid crystal display panel.

10. The data line repair structure as claimed in claim 8, further comprising a sixth repair line formed on an oblique line area of the liquid crystal display panel and connected to the first repair line and the fifth repair line.

11. The data line repair structure as claimed in claim 10, wherein a transparent conductive layer is disposed between the sixth repair line and the first repair line.

12. The data line repair structure as claimed in claim 1, wherein the first end of the data line is on one side near the source driving chip and the second end of the data line is on the opposite side of the source driving chip.

13. A data line repair method for a liquid crystal display panel comprising a scan line, a data line crossing the scan line, a thin film transistor formed where the scan line crosses the data line and connected to a pixel electrode, a gate driving chip electrical connected to the scan line to generate a gate signal to drive the thin film transistor, and a source driving chip connected to the data line to provide a data signal to the pixel electrode, the data line repair method comprising:

forming a first data repair line, the first data repair line parallel to the scan line and crossing a first end of the data line;

welding and connecting the first repair line with the data line;

forming a second data repair line, the second data repair line parallel to the data line and connecting with the gate driving chip;

forming a third repair line, the third repair data line parallel to the scan line and crossing a second end of the data line; and welding and connecting the third repair line with the data line;

wherein the source driving chip uses the first repair line, the second repair line and the third repair line to write the data signal to the pixel electrode when the data line has a broken point.

14. The data line repair method as claimed in claim 13, wherein the gate driving chip is bound to the liquid crystal display panel.

15. The data line repair method as claimed in claim 13, wherein the gate driving chip is bound to a flexible board, the second repair line is connected to the gate driving chip by a line of the flexible board and the third repair line is connected to the gate driving chip by another line of the flexible board.

16. The data line repair method as claimed in claim 13, wherein the second repair line is connected to a bypass circuit line of the flexible board and the third repair line is connected to the bypass circuit line of the flexible board.

17. The data line repair method as claimed in claim 13, further comprising a fourth repair line formed on an oblique line area of the liquid crystal display panel and connected to the first repair line and lines of a printed circuit board.

18. The data line repair method as claimed in claim 17, wherein the fourth repair line is connected to the lines of the printed circuit board through a flexible board and the source driving chip is connected to the flexible board.

19. The data line repair method as claimed in claim 18, wherein a transparent conductive layer is disposed between the fourth repair line and the first repair line.

20. The data line repair method as claimed in claim 13, further comprising a fifth repair line parallel to the scan line and connected to the source driving chip.

21. The data line repair method as claimed in claim 20, wherein the source driving chip is bound to the liquid crystal display panel.

22. The data line repair method as claimed in claim 20, further comprising a sixth repair line formed in an oblique line area of the liquid crystal display panel and connected to the first repair line and the fifth repair line.

23. The data line repair method as claimed in claim 22, wherein a transparent conductive layer is disposed between the sixth repair line and the first repair line.

24. The data line repair method as claimed in claim 13, wherein the first end of the data line is on one side near the source driving chip and the second end of the data line is on the opposite side of the source driving chip.

\* \* \* \* \*